US012769230B2

(12) United States Patent
Kamimura et al.

(10) Patent No.: US 12,769,230 B2
(45) Date of Patent: *Oct. 20, 2026

(54) DEVELOPING CARTRIDGE INCLUDING MOVABLE PLATE FOR MOVING HOLDER HOLDING ELECTRICAL CONTACT SURFACE

(71) Applicant: BROTHER KOGYO KABUSHIKI KAISHA, Nagoya (JP)

(72) Inventors: Naoya Kamimura, Ichinomiya (JP); Tomitake Aratachi, Toyokawa (JP); Yasuo Fukamachi, Nagoya (JP); Junichi Hashimoto, Toyohashi (JP); Saya Minoshima, Gifu (JP); Nao Itabashi, Nagoya (JP); Kazutoshi Nakamura, Kuwana (JP); Misato Osuka, Nagoya (JP); Junya Sumida, Ama (JP); Shinya Kusuda, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/982,727

(22) Filed: Dec. 16, 2024

(65) Prior Publication Data

US 2025/0116953 A1 Apr. 10, 2025

Related U.S. Application Data

(63) Continuation of application No. 18/364,635, filed on Aug. 3, 2023, now Pat. No. 12,210,300, which is a (Continued)

(30) Foreign Application Priority Data

Mar. 31, 2021 (JP) ................................ 2021-061271

(51) Int. Cl.
*G03G 15/08* (2006.01)
*G03G 21/18* (2006.01)

(52) U.S. Cl.
CPC ....... *G03G 15/087* (2013.01); *G03G 15/0808* (2013.01); *G03G 21/1821* (2013.01); *G03G 21/1864* (2013.01)

(58) Field of Classification Search
CPC ............. G03G 15/087; G03G 15/0808; G03G 21/1821; G03G 21/1864; G03G 21/1885;

(Continued)

(56) References Cited

U.S. PATENT DOCUMENTS 10,025,264 B1 7/2018 Itabashi
11,762,312 B2 * 9/2023 Kamimura ......... G03G 21/1821 399/111

(Continued)

FOREIGN PATENT DOCUMENTS

CN 102385285 A 3/2012
CN 103713508 A 4/2014

(Continued)

OTHER PUBLICATIONS

Extended European Search Report issued in corresponding European Patent Application No. 22156947.8, Jul. 14, 2022.

(Continued)

*Primary Examiner* — Sandra Brase
(74) *Attorney, Agent, or Firm* — Merchant & Gould P.C.

(57) ABSTRACT

A developing cartridge includes a casing, a developing roller rotatable about an axis extending in a first direction, a developing memory having an electrical contact surface, an agitator, an agitator gear rotatable about an agitator axis together with the agitator, a holder holding the electrical contact surface, and a plate movable between a first position and a second position in a second direction crossing the first (Continued)

direction relative to the casing. The holder is movable relative to the casing in a third direction crossing the first and second directions between a retracted position and an advancing position. The holder is movable from the retracted position to the advancing position in response to a movement of the plate from the first position to the second position. The plate is positioned farther away from the developing roller than the agitator gear and the holder are in the second direction.

20 Claims, 12 Drawing Sheets

Related U.S. Application Data continuation of application No. 17/672,323, filed on Feb. 15, 2022, now Pat. No. 11,762,312.

(58) Field of Classification Search
CPC .......... G03G 15/0863; G03G 21/1878; G03G 21/1652
See application file for complete search history.

(56) References Cited

U.S. PATENT DOCUMENTS

| | | | |
|---|---|---|---|
| 12,210,300 B2* | 1/2025 | Kamimura | G03G 21/1821 |
| 2012/0051795 A1 | 3/2012 | Mushika et al. | |
| 2014/0092197 A1 | 4/2014 | Aoi | |
| 2015/0261176 A1 | 9/2015 | Moon et al. | |
| 2017/0184998 A1 | 6/2017 | Itabashi | |
| 2017/0277116 A1 | 9/2017 | Itabashi | |
| 2017/0277117 A1 | 9/2017 | Taguchi et al. | |
| 2018/0046131 A1 | 2/2018 | Itabashi | |
| 2018/0095416 A1 | 4/2018 | Nishiyama et al. | |
| 2018/0181022 A1 | 6/2018 | Itabashi | |
| 2018/0284690 A1 | 10/2018 | Mizutani | |

FOREIGN PATENT DOCUMENTS

| | | | |
|---|---|---|---|
| CN | 107239029 | A | 10/2017 |
| CN | 107728445 | A | 2/2018 |
| CN | 107885057 | A | 4/2018 |
| CN | 108255033 | A | 7/2018 |
| CN | 108663919 | A | 10/2018 |
| CN | 108663920 | A | 10/2018 |
| EP | 2 919 075 | A1 | 9/2015 |
| EP | 3 301 516 | A1 | 4/2018 |
| EP | 3 382 459 | A1 | 10/2018 |
| JP | 2004-61596 | A | 2/2004 |
| JP | 2012-053095 | A | 3/2012 |
| JP | 2017-116826 | A | 6/2017 |
| JP | 2017-173648 | A | 9/2017 |
| JP | 2017-181527 | A | 10/2017 |
| JP | 2018-25677 | A | 2/2018 |
| JP | 2018-169521 | A | 11/2018 |

OTHER PUBLICATIONS

Office Action issued in corresponding Japanese application No. 2021-061271, Oct. 22, 2024.

* cited by examiner

DEVELOPING CARTRIDGE INCLUDING MOVABLE PLATE FOR MOVING HOLDER HOLDING ELECTRICAL CONTACT SURFACE

REFERENCE TO RELATED APPLICATIONS

This application is a continuation of U.S. patent application Ser. No. 18/364,635 filed Aug. 3, 2023, now U.S. Pat. No. 12,210,300, which is a continuation of U.S. patent application Ser. No. 17/672,323, filed Feb. 15, 2022, now U.S. Pat. No. 11,762,312, which claims priority from Japanese Patent Application No. 2021-061271 filed Mar. 31, 2021. The entire contents of the aforementioned applications are incorporated herein by reference.

BACKGROUND ART

There has been known a developing cartridge including a developing memory having an electrical contact surface, and a holder holding the electrical contact surface. The electrical contact surface is fixed to one end of the holder. The electrical contact surface and the holder are moveable relative to a casing of the developing cartridge.

This developing cartridge is attachable to and detachable from a drawer. The drawer is attachable to and detachable from an apparatus body of an image-forming apparatus. The drawer includes a drawer-side electrical contact surface with which the electrical contact surface of the developing memory makes contact in a state where the developing cartridge is attached to the drawer.

When the developing cartridge is attached to the drawer, the holder holding the electrical contact surface moves relative to the drawer-side electrical contact surface. As a result, friction between the electrical contact surface and the drawer-side electrical contact surface generated at the time of attachment of the developing cartridge to the drawer is reduced.

DESCRIPTION

Summary

There is also a need to seek for an alternative mechanism to allow the holder holding the electrical contact surface to be movable relative to the casing.

In view of the foregoing, it is an object of the disclosure to provide a new structure for enabling the holder holding the electrical contact surface to move relative to the casing.

In order to attain the above and other object, according to one aspect, the present disclosure provides a developing cartridge including a casing, a developing roller, a developing memory, an agitator, an agitator gear, a holder, and a plate. The casing is configured to accommodate toner therein. The developing roller is rotatable about a developing axis extending in a first direction. The developing roller is positioned at one end portion of the casing in a second direction crossing the first direction. The developing memory has an electrical contact surface facing in a third direction crossing the first direction and the second direction. The agitator is rotatable about an agitator axis extending in the first direction and is configured to agitate the toner accommodated in the casing. The agitator gear is positioned at one end of the agitator in the first direction and is rotatable about the agitator axis together with the agitator. The holder holds the electrical contact surface and is movable relative to the casing in the third direction between a retracted position and an advancing position. A distance in the third direction between the electrical contact surface and the agitator axis at the advancing position of the holder is greater than a distance in the third direction between the electrical contact surface and the agitator axis at the retracted position of the holder. The plate is movable in the second direction relative to the casing between a first position and a second position, the second position being closer to the developing roller than the first position is to the developing roller in the second direction. The holder is movable from the retracted position to the advancing position in response to a movement of the plate from the first position to the second position. The plate is positioned farther away from the developing roller than the agitator gear and the holder are from the developing roller in the second direction.

With this structure, the holder can be moved from the retracted position to the advanced position in association with movement of the plate from the first position to the second position.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

First Embodiment

Hereinafter, a developing cartridge 30 according to a first embodiment will be described with reference to FIGS. 1 through 7B.

Figure 1:
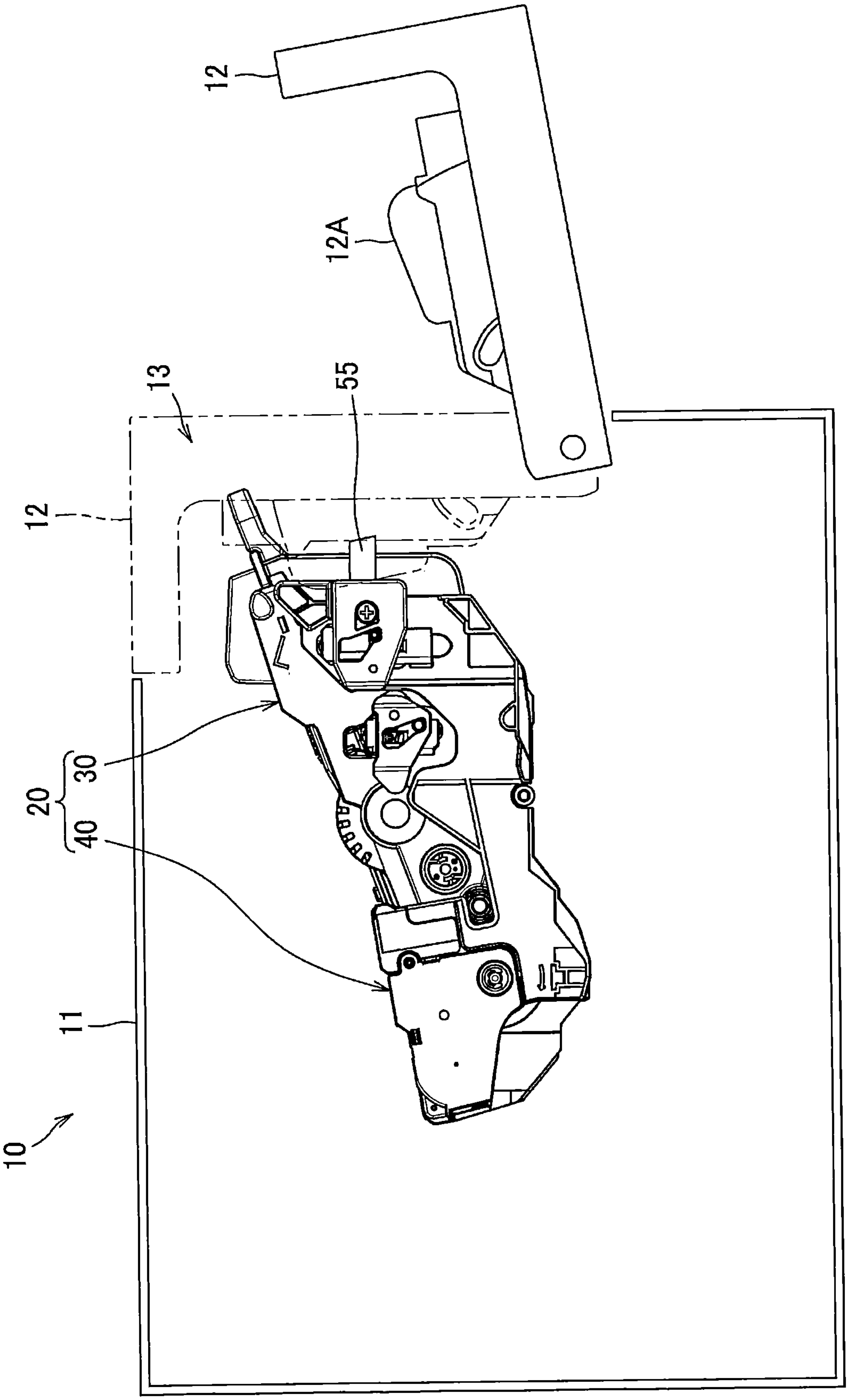
FIG. 1 is a schematic side view illustrating a state where a process cartridge is attached to an apparatus body of an image-forming apparatus.

As illustrated in FIG. 1, the developing cartridge 30 is attachable to an apparatus body 10 of an image-forming apparatus. Specifically, the apparatus body 10 includes a housing 11 having an opening 13, and a cover 12 for opening and closing the opening 13. The cover 12 is pivotally movable relative to the housing 11 between a closed position indicated by a two-dotted chain line where the cover 12 closes the opening 13 and an open position indicated by a solid line where the cover 12 opens the opening 13. A process cartridge 20 is attachable to the apparatus body 10 through the opening 13 in a state where the cover 12 is at the open position.

The cover 12 has a protruding portion 12A configured to protrude into an interior of the housing 11 in a state where the cover 12 is at the closed position. The protruding portion 12A is so shaped that the protruding portion 12A can press a plate 55 (described later) of the developing cartridge 30 in the state where the cover 12 is at the closed position.

Figure 2:
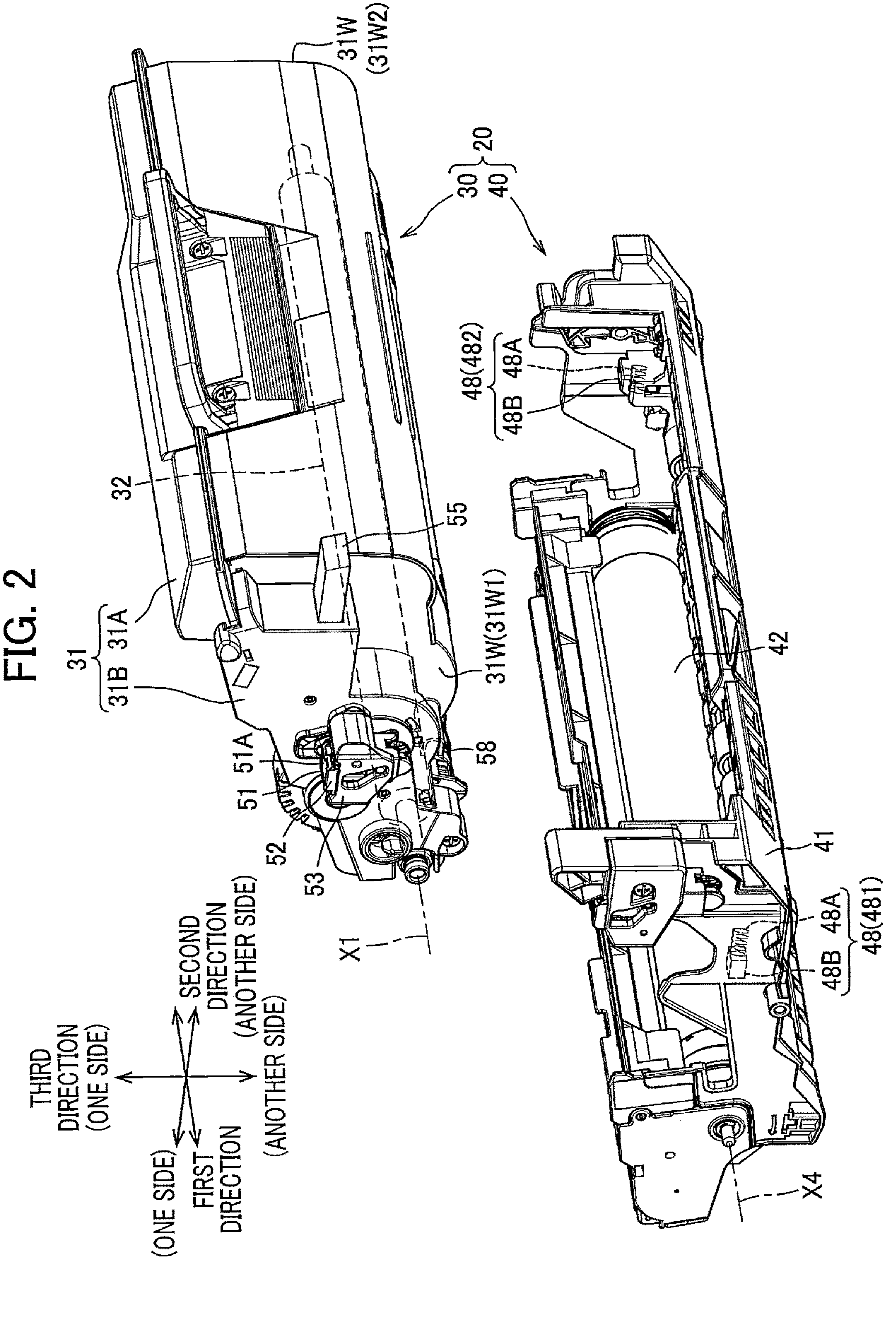
FIG. 2 is a perspective view of a drum cartridge and a developing cartridge in a separated state from each other.

As illustrated in FIG. 2, the process cartridge 20 includes the developing cartridge 30 and a drum cartridge 40. The drum cartridge 40 includes a drum frame 41, a photosensitive drum 42, and a pair of pressing portions 48.

The photosensitive drum 42 is rotatable about a drum axis X4 extending in a first direction. The drum frame 41 rotatably supports the photosensitive drum 42.

The pressing portions 48 are configured to press the developing cartridge 30 in a state where the developing cartridge 30 is attached to the drum cartridge 40. The pressing portions 48 are positioned at the drum frame 41. Each pressing portion 48 includes a spring 48A and a pressing member 48B. The pressing member 48B is urged toward the photosensitive drum 42 by the spring 48A. Specifically, the pair of pressing portions 48 are: a first pressing portion 481; and a second pressing portion 482 positioned away from the first pressing portion 481 in the first direction.

The developing cartridge 30 includes a casing 31, a developing roller 32, a developing memory 51, a holder 52, a holder cover 53, and the plate 55.

The casing 31 is configured to store toner therein. The casing 31 includes: a casing body 31A configured to store the toner; and a gear cover 31B covering at least a part of an agitator gear 60 (described later). In the present embodiment, the gear cover 31B covers an entirety of the agitator gear 60 (see FIGS. 4A and 4B).

The casing body 31A includes two side walls 31W and a pair of protrusions 58. The side walls 31W include a first side wall 31W1 and a second side wall 31W2 positioned apart from the first side wall 31W1 in the first direction. The side walls 31W (31W1, 31W2) are at end portions of the casing body 31A in the first direction. The protrusions 58 are positioned each at one of the side walls 31W (In FIG. 2, only one of the protrusions 58 positioned on the side wall 31W1 is illustrated).

Specifically, one of the protrusions 58 is positioned at the first side wall 31W1 and the other protrusion 58 is positioned at the second side wall 31W2. The protrusions 58 protrude from the respective side walls 31W outward in the first direction. The protrusions 58 are urged toward the photosensitive drum 42 by the respective pressing portions 48 in the state where the developing cartridge 30 is attached to the drum cartridge 40. In this way, the casing 31 is pushed by the pressing portions 48 so that the developing roller 32 held by the casing 31 is pressed against the photosensitive drum 42.

Figure 3:
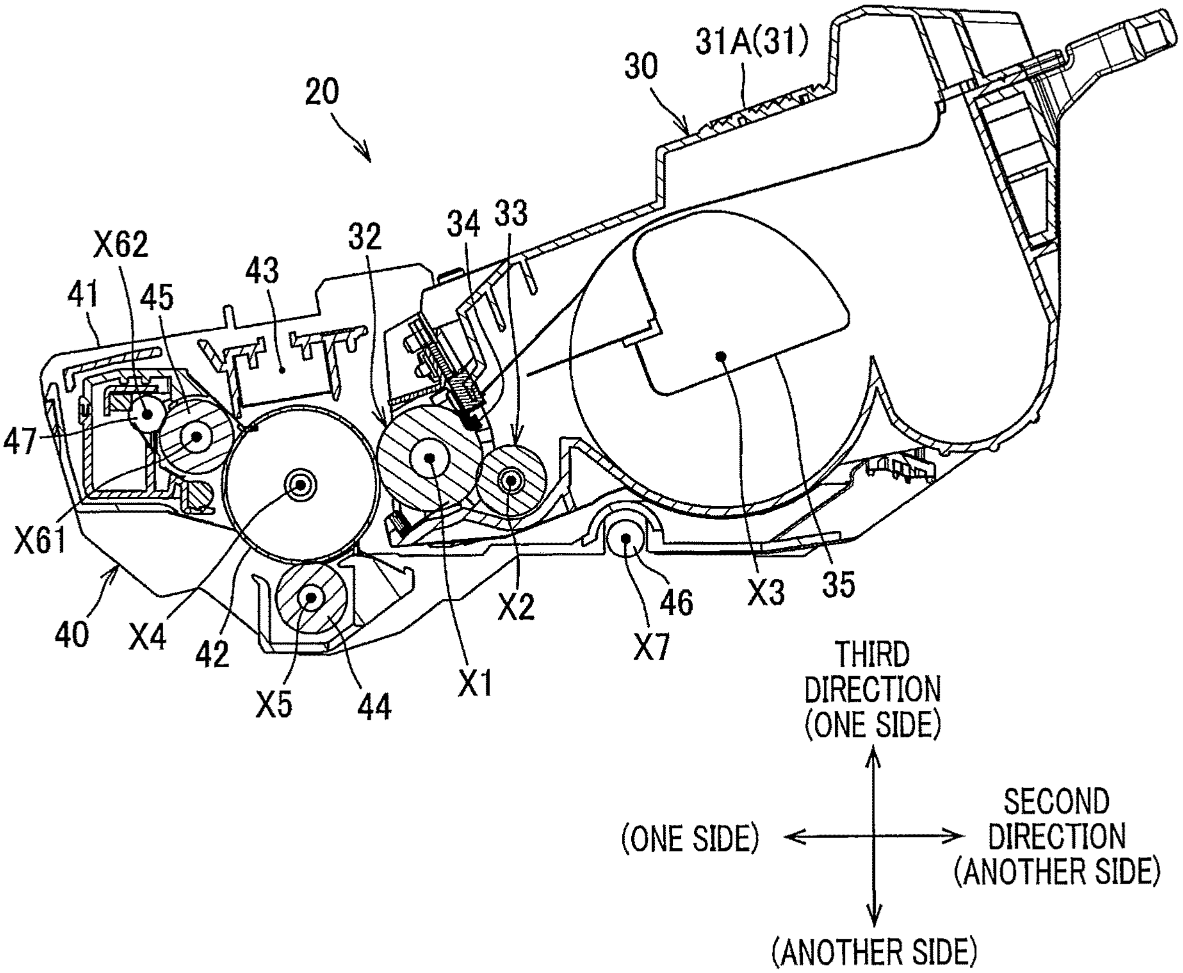
FIG. 3 is a cross-sectional view of the process cartridge.

The developing roller 32 is configured to supply toner to the photosensitive drum 42. Referring to FIGS. 2 and 3, the developing roller 32 is rotatable about a developing axis X1 extending in the first direction. The developing roller 32 is positioned at one end portion of the casing 31 in a second direction crossing the first direction. In the present embodiment, the second direction is perpendicular to the first direction.

The developing memory 51 is configured to store information on the developing cartridge 30, such as identification information and a service life of the developing cartridge 30. The developing memory 51 has an electrical contact surface 51A facing in a third direction crossing the first direction and the second direction. In the present embodiment, the third direction is perpendicular to the first direction and the second direction. The electrical contact surface 51A is positioned at one surface of a circuit board (not illustrated). The developing memory 51 also includes a memory element (not illustrated) which is positioned at an opposite surface of the circuit board. While the memory element is positioned at the circuit board in the present embodiment, the memory element may be positioned away from the circuit board so as to be electrically connected to the electrical contact surface 51A and the circuit board by wirings.

The holder 52 has an elongated shape extending in the third direction. The holder 52 has one end portion in the third direction holding the electrical contact surface 51A. In the present embodiment, the developing memory 51 is held at the one end portion of the holder 52 in the third direction.

Figure 4A:
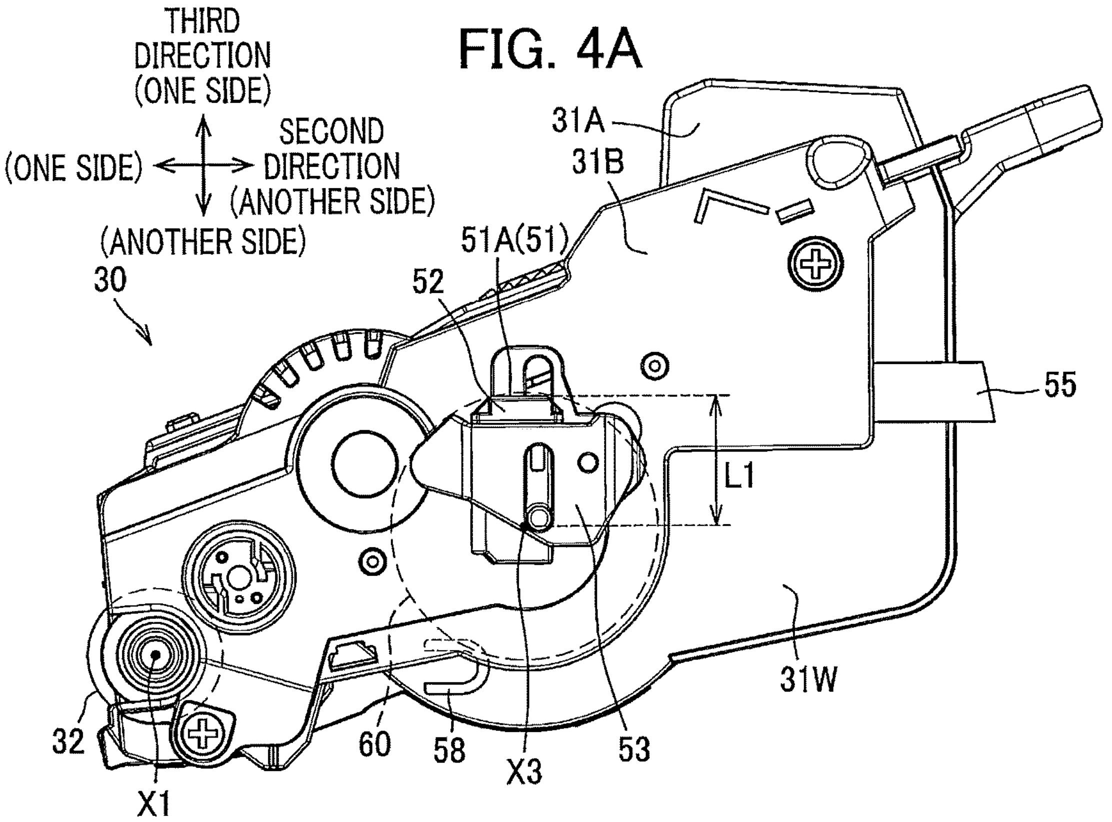
FIG. 4A is a side view of the developing cartridge in a state where a holder thereof is at a retracted position.
Figure 4B:
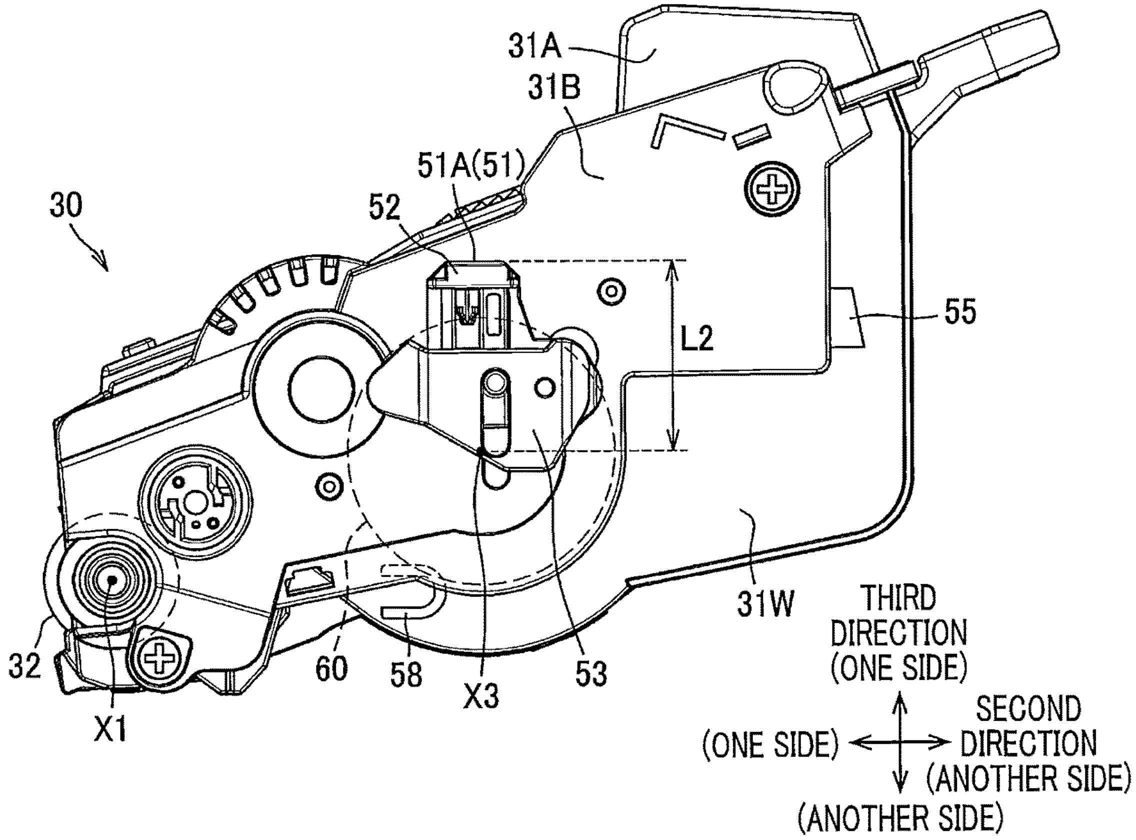
FIG. 4B is a side view of the developing cartridge in a state where the holder is at an advancing position.

The holder cover 53 holds the holder 52 such that the holder 52 is movable relative to the casing 31 between a retracted position (depicted in FIG. 4A) and an advancing position (depicted in FIG. 4B).

As illustrated in FIGS. 4A and 4B, the plate 55 is configured to be moved by the cover 12 in order to move the holder 52 and the electrical contact surface 51A of the developing memory 51 in the third direction. The plate 55 is movable in the second direction. Specifically, the plate 55 is slidably movably guided by the gear cover 31B. The shape of the plate 55 may be arbitrary. The plate 55 may have a thin plate-like shape or may have a thick rod-like shape.

The plate 55 is positioned at another end portion of the casing 31 in the second direction. The plate 55 is positioned farther away from the developing roller 32 than the holder 52 is from the developing roller 32 in the second direction. Further, the plate 55 is positioned farther away from the developing roller 32 than the agitator gear 60 is from the developing roller 32 in the second direction. With this structure, since the plate 55 is positioned farther from the developing roller 32 than the agitator gear 60 and the holder 52 are from the developing roller 32 in the second direction, the plate 55 can be easily pushed and moved by the cover 12.

The plate 55 is movable relative to the casing 31 between a first position illustrated in FIG. 4A (where the plate 55 places the holder 52 at the retracted position) and a second position illustrated in FIG. 4B (where the plate 55 places the holder 52 at the advancing position). The plate 55 at the second position is positioned closer to the developing roller 32 in the second direction than the plate 55 at the first position is. The plate 55 protrudes out in the second direction from the casing 31 in a state where the plate 55 is at the first position.

As illustrated in FIG. 3, the drum cartridge 40 further includes a charger 43, a transfer roller 44, a first cleaning roller 45, a second cleaning roller 47, and a conveyer roller 46.

The charger 43 is configured to charge the photosensitive drum 42. The charger 43 is a Scorotron-type charger positioned away from the photosensitive drum 42.

The transfer roller 44 is configured to transfer toner on the photosensitive drum 42 onto a sheet (not illustrated). The transfer roller 44 is rotatable about a transfer axis X5 extending in the first direction. The transfer roller 44 is in contact with the photosensitive drum 42. The transfer roller 44 faces the photosensitive drum 42 in the third direction.

The first cleaning roller 45 is configured to remove toner deposited on the photosensitive drum 42. The first cleaning roller 45 is rotatable about a first cleaning axis X61 extending in the first direction. The first cleaning roller 45 is in contact with the photosensitive drum 42.

The second cleaning roller 47 is configured to remove toner deposited on the first cleaning roller 45. The second cleaning roller 47 is rotatable about a second cleaning axis X62 extending in the first direction. The second cleaning roller 47 is in contact with the first cleaning roller 45.

The conveyer roller 46 is configured to convey the sheet toward the photosensitive drum 42. The conveyer roller 46 is rotatable about a conveyer axis X7 extending in the first direction.

The developing cartridge 30 further includes a supply roller 33, a layer thickness regulation blade 34, and an agitator 35.

The supply roller 33 is configured to supply toner to the developing roller 32. The supply roller 33 is rotatable about a supply axis X2 extending in the first direction. The supply roller 33 is positioned inside the casing body 31A.

The layer thickness regulation blade 34 is configured to regulate a thickness of a toner layer on the developing roller 32. The layer thickness regulation blade 34 is in contact with the developing roller 32.

The agitator 35 is configured to agitate the toner accommodated in the casing body 31A. The agitator 35 is also configured to supply the toner to the supply roller 33. The agitator 35 is rotatable about an agitator axis X3 extending in the first direction. The agitator 35 is positioned inside the casing body 31A.

As illustrated in FIG. 4A, in a state where the holder 52 is at the retracted position, the electrical contact surface 51A and the agitator axis X3 define a first distance L1 therebetween in the third direction. As illustrated in FIG. 4B, in a state where the holder 52 is at the advancing position, the electrical contact surface 51A and the agitator axis X3 define a second distance L2 therebetween in the third direction, the second distance L2 being greater than the first distance L1.

Figure 5A:
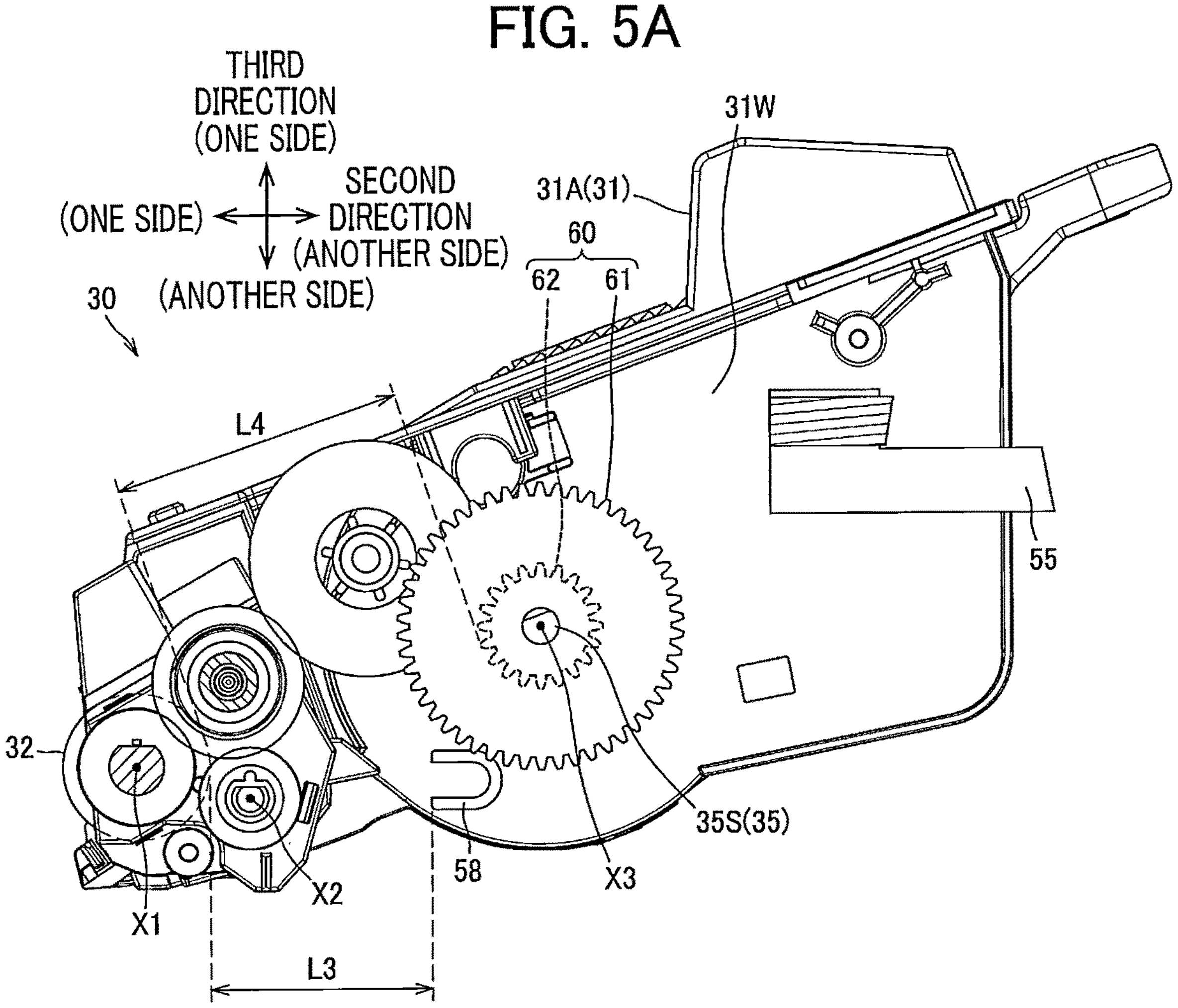
FIG. 5A is a cross-sectional view of the developing cartridge in a state where a gear cover thereof is removed.

As illustrated in FIG. 5A, the agitator gear 60 is positioned at one end of the agitator 35 in the first direction. Specifically, the agitator 35 includes a shaft 35S. The agitator gear 60 is positioned at one end portion of the shaft 35S in the first direction. The agitator gear 60 is fixed to the shaft 35S, and the agitator gear 60 is rotatable together with the agitator 35 about the agitator axis X3.

Figure 5B:
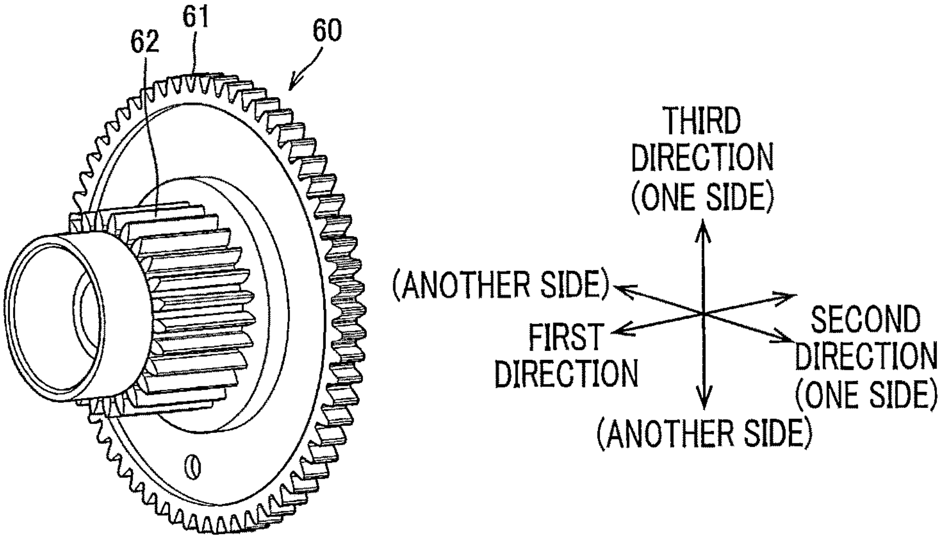
FIG. 5B is a perspective view of an agitator gear when viewed from a small diameter gear side thereof.

As illustrated in FIG. 5B, the agitator gear 60 includes a large diameter gear 61 and a small diameter gear 62. The small diameter gear 62 has a diameter smaller than a diameter of the large diameter gear 61. The small diameter gear 62 is positioned between the large diameter gear 61 and the casing body 31A in the first direction.

As illustrated in FIG. 5A, the protrusion 58 protrudes in the first direction from one end in the first direction of the casing body 31A. The protrusion 58 is positioned between the casing body 31A and the large diameter gear 61 in the first direction. The developing roller 32 and the protrusion 58 define a distance L3 that is smaller than a distance L4 between the developing roller 32 and the small diameter gear 62.

Figure 6:
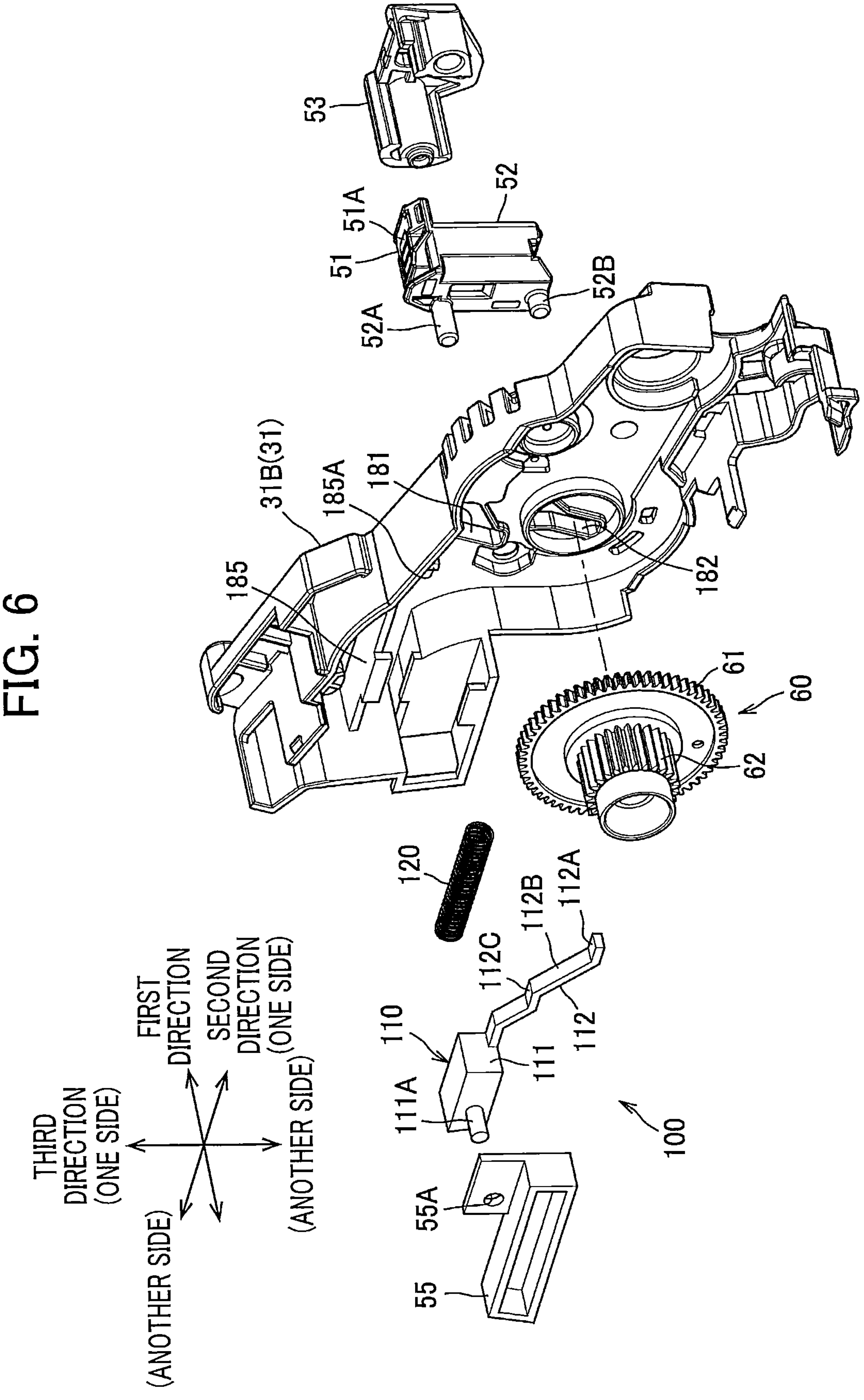
FIG. 6 is an exploded perspective view of an interlocking mechanism in the developing cartridge according to a first embodiment.

As illustrated in FIG. 6, the holder 52 is positioned opposite to the agitator gear 60 in the first direction with respect to the gear cover 31B. Further, the holder 52 is positioned opposite to the small diameter gear 62 in the first direction with respect to the large diameter gear 61.

Figure 7A:
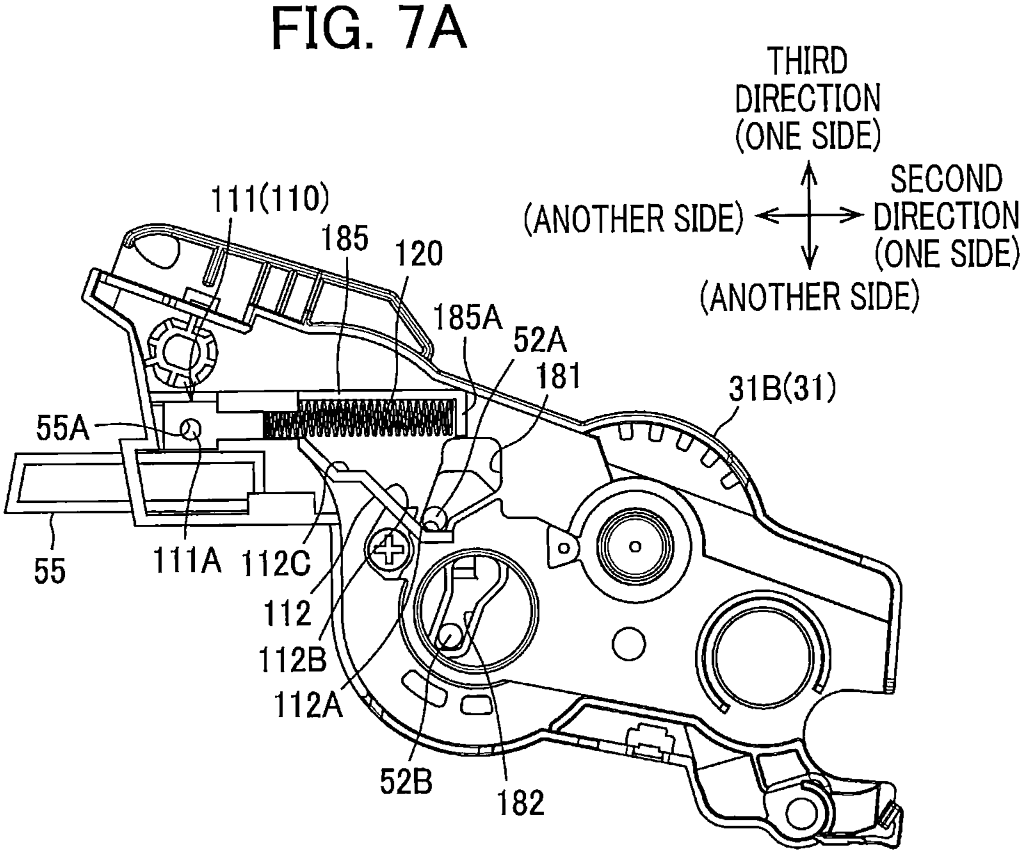
FIG. 7A is a view illustrating the interlocking mechanism in the developing cartridge according to the first embodiment when viewed from inside of the gear cover, and particularly illustrating a state where a plate is at a first position.
Figure 7B:
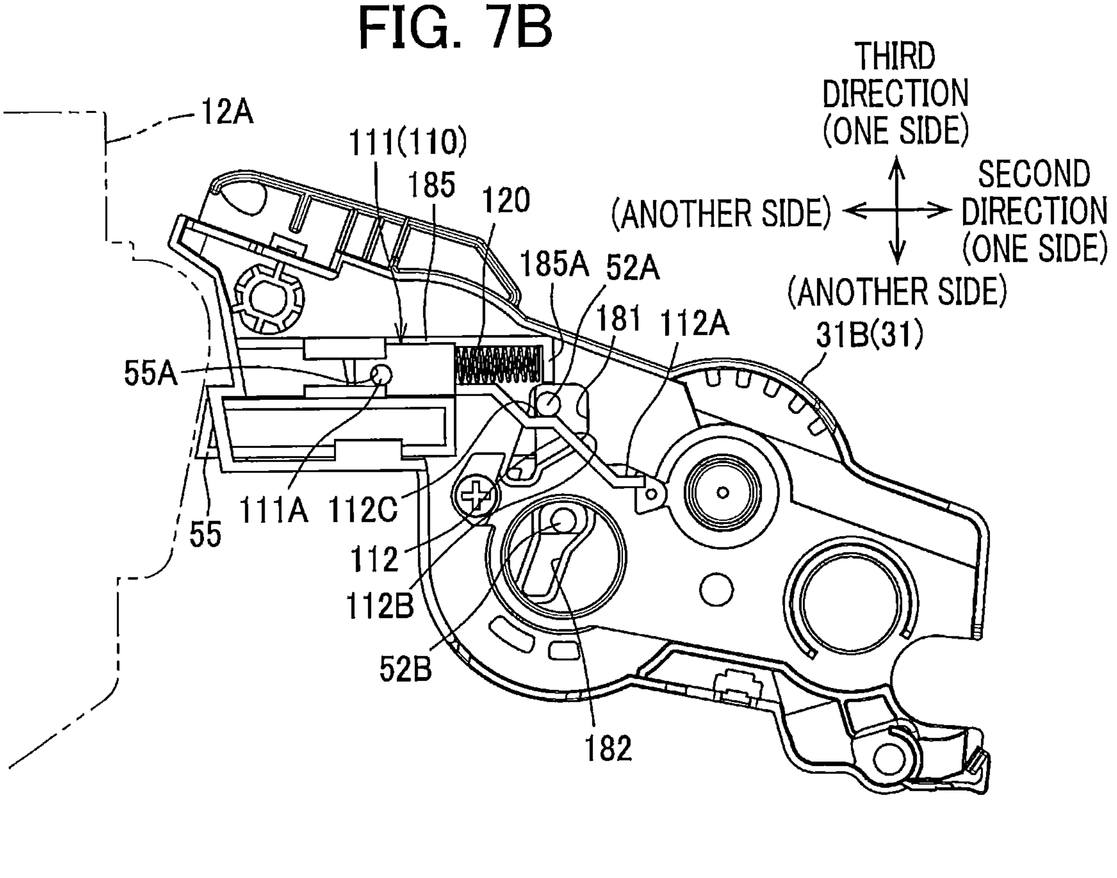
FIG. 7B is a view illustrating the interlocking mechanism in the developing cartridge according to the first embodiment when viewed from inside of the gear cover, and particularly illustrating a state where the plate is at a second position.

The developing cartridge 30 further includes an interlocking mechanism 100 connected to each of the plate 55 and the holder 52. The interlocking mechanism 100 is configured to place the holder 52 at the retracted position (see FIG. 4A) in the state where the plate 55 is at the first position as illustrated in FIG. 7A and to place the holder 52 at the advancing position (see FIG. 4B) in a state where the plate 55 is at the second position as illustrated in FIG. 7B.

In the present embodiment, the interlocking mechanism 100 includes a cam 110 and a spring 120.

The cam 110 is configured to move in association with the movement of the plate 55 between the first position and the second position. The cam 110 is a translation cam (linear cam) which is movable in the second direction relative to the casing 31. Specifically, the cam 110 includes a connecting portion 111 and a cam portion 112.

The connecting portion 111 is connected to the plate 55. The connecting portion 111 includes a boss 111A protruding in the first direction. On the other hand, the plate 55 has a hole 55A in which the boss 111A is engaged. By the engagement of the boss 111A in the hole 55A, the cam 110 is allowed to move integrally with the plate 55. In other words, the cam 110 is movable together with the plate 55 by the engagement of the boss 111A in the hole 55A. The cam 110 is slidably movable in the second direction together with the plate 55.

The cam portion 112 is in contact with the holder 52 and is configured to move the holder 52 between the retracted position and the advancing position. The cam portion 112 is elongated from the connecting portion 111.

As also illustrated in FIG. 6, the holder 52 further includes a first boss 52A and a second boss 52B each extending in the first direction. The second boss 52B is positioned farther away from the electrical contact surface 51A than the first boss 52A is from the electrical contact surface 51A in the third direction. The first boss 52A has a length in the first direction greater than a length in the first direction of the second boss 52B. In other words, the first boss 52A has a protruding amount greater than a protruding amount of the second boss 52B.

The gear cover 31B has a first guide hole 181 and a second guide hole 182. The first guide hole 181 and the second guide hole 182 extend throughout a thickness of the gear cover 31B in the first direction. The first guide hole 181 and second guide hole 182 are each elongated in the third direction. The first boss 52A is inserted in the first guide hole 181. Specifically, the first boss 52A extends through the first guide hole 181. The second boss 52B is inserted in the second guide hole 182. Specifically, the second boss 52B extends through the second guide hole 182. With this configuration, the movement of the holder 52 in the third direction is guided by the gear cover 31B.

The cam portion 112 extends in the second direction from the connecting portion 111. Specifically, the cam portion 112 extends from the connecting portion 111 toward one side in the second direction (toward the right in FIG. 6). More specifically, the cam portion 112 extends in the second direction toward the developing roller 32 from the connecting portion 111.

The cam portion 112 has a base end connected to the connecting portion 111, and a free end apart from the connecting portion 111 in the second direction. The cam portion 112 includes a first retaining surface 112A, a sloped surface 112B, and a second retaining surface 112C. The first retaining surface 112A, the sloped surface 112B, and the second retaining surface 112C are arrayed in this order from the free end toward the base end of the cam portion 112.

The first retaining surface 112A faces one side in the third direction (upward in FIG. 6). The first retaining surface 112A contacts the first boss 52A in a case where the plate 55 is at the first position. In the case where the plate 55 is at the first position, the first retaining surface 112A is positioned further toward another side in the third direction (downward in FIG. 7A) relative to the first boss 52A.

The sloped surface 112B is inclined relative to the second direction which is a moving direction of the cam 110. The sloped surface 112B is inclined with respect to the first retaining surface 112A and the second retaining surface 112C. The sloped surface 112B is inclined with respect to the second direction such that the sloped surface 112B extends toward the one side in the third direction (upward in FIG. 7A) as approaching the second retaining surface 112C from the boss first retaining surface 112A (toward the left in FIG. 7A). The sloped surface 112B is configured to contact the first boss 52A to move the holder 52 from the retracted position to the advancing position in accordance with the movement of the plate 55 from the first position to the second position.

The second retaining surface 112C faces the one side (upward in FIG. 6) in the third direction. The second retaining surface 112C contacts the first boss 52A to retain the holder 52 at the advancing position (see FIG. 7B) in a case where the plate 55 is at the second position.

The spring 120 urges the plate 55 toward the first position from the second position. The spring 120 is a compression coil spring. The spring 120 extends in the second direction. Here, the gear cover 31B includes a guide portion 185 configured to guide movement of the cam 110 and the spring 120 in the second direction. The guide portion 185 includes a wall 185A with which one end of the spring 120 contacts. The spring 120 has another end in contact with the connecting portion 111. An initial load is imparted on the spring 120 in the state where the plate 55 is at the first position.

The developing cartridge 30 according to the first embodiment thus constructed is configured to be attached to the apparatus body 10 through the opening 13 in the state where the cover 12 is at the open position, as illustrated in FIG. 1. In accordance with the movement of the cover 12 from the open position (indicated by the solid line) to the closed position (indicated by the two dotted chain line) after attachment of the developing cartridge 30 to the apparatus body 10, the plate 55 is pushed by the protruding portion 12A of the cover 12 so that the plate 55 moves from the first position to the second position.

In the state where the plate 55 is at the first position illustrated in FIG. 7A, the first retaining surface 112A of the cam portion 112 is positioned further toward the other side in the third direction (downward) relative to the first boss 52A of the holder 52. Subsequently, as the plate 55 moves toward the second position from the state depicted in FIG. 7A, the sloped surface 112B of the cam 110 moves the first boss 52A toward the one side in the third direction (upward), thereby causing the holder 52 to move from the retracted position illustrated in FIG. 4A to the advancing position illustrated in FIG. 4B. In the meantime, the cam 110 compresses the spring 120. In a state where the first boss 52A is on the second retaining surface 112C of the cam 110, the second retaining surface 112C retains the holder 52 at the advancing position.

Reversely, in a case where the cover 12 is moved from the closed position (illustrated in FIG. 7B) to the open position, the protruding portion 12A of the cover 12 is separated away from the plate 55. Hence, the plate 55 moves from the second position to the first position (illustrated in FIG. 7A) by an urging force of the spring 120. Accordingly, the second retaining surface 112C of the cam 110 no longer retains the holder 52, so that the holder 52 is moved downward toward the other side in the third direction because of its own weight.

As described above, in the developing cartridge 30 according to the first embodiment, the holder 52 can move from the retracted position to the advancing position in response to the movement of the plate 55 from the first position to the second position.

Various modifications may be applied to the first embodiment.

For example, in the first embodiment, the plate 55 is slidably movable in the second direction. However, the plate 55 may be pivotally movably supported by the casing 31.

Further, the cam 110 is connected to the plate 55 by the engagement of the boss 111A in the hole 55A. However, the cam 110 may be fixed to the plate 55. Further, while the cam 110 is configured to move integrally with the plate 55 in the first embodiment, the cam 110 may be configured to move in accordance with the movement of the plate 55 between the first position and the second position.

Still further, a different intervening mechanism may be provided between the cam 110 and the plate 55 to move the cam 110 in interlocking relation to the movement of the plate 55.

Further, in the first embodiment, the spring 120 is in contact with the connecting portion 111 of the cam 110 to urge the plate 55 from the second position to the first position through the connecting portion 111. However, the spring may not be in contact with the connecting portion 111 of the cam 110. For example, instead of the spring 120, the developing cartridge 30 may include a spring contacting the holder 52. In this case, the spring may urge the holder 52 toward the retracted position from the advancing position to urge the plate 55 from the second position to the first position through the interlocking mechanism 100.

Second Embodiment

Next, a developing cartridge according to a second embodiment will be described with reference to FIGS. 8 through 10B, wherein like parts and components are designated by the same reference numerals as those shown in the first embodiment. The second embodiment is the same as the first embodiment except a structure in relation to the interlocking mechanism.

Figure 8:
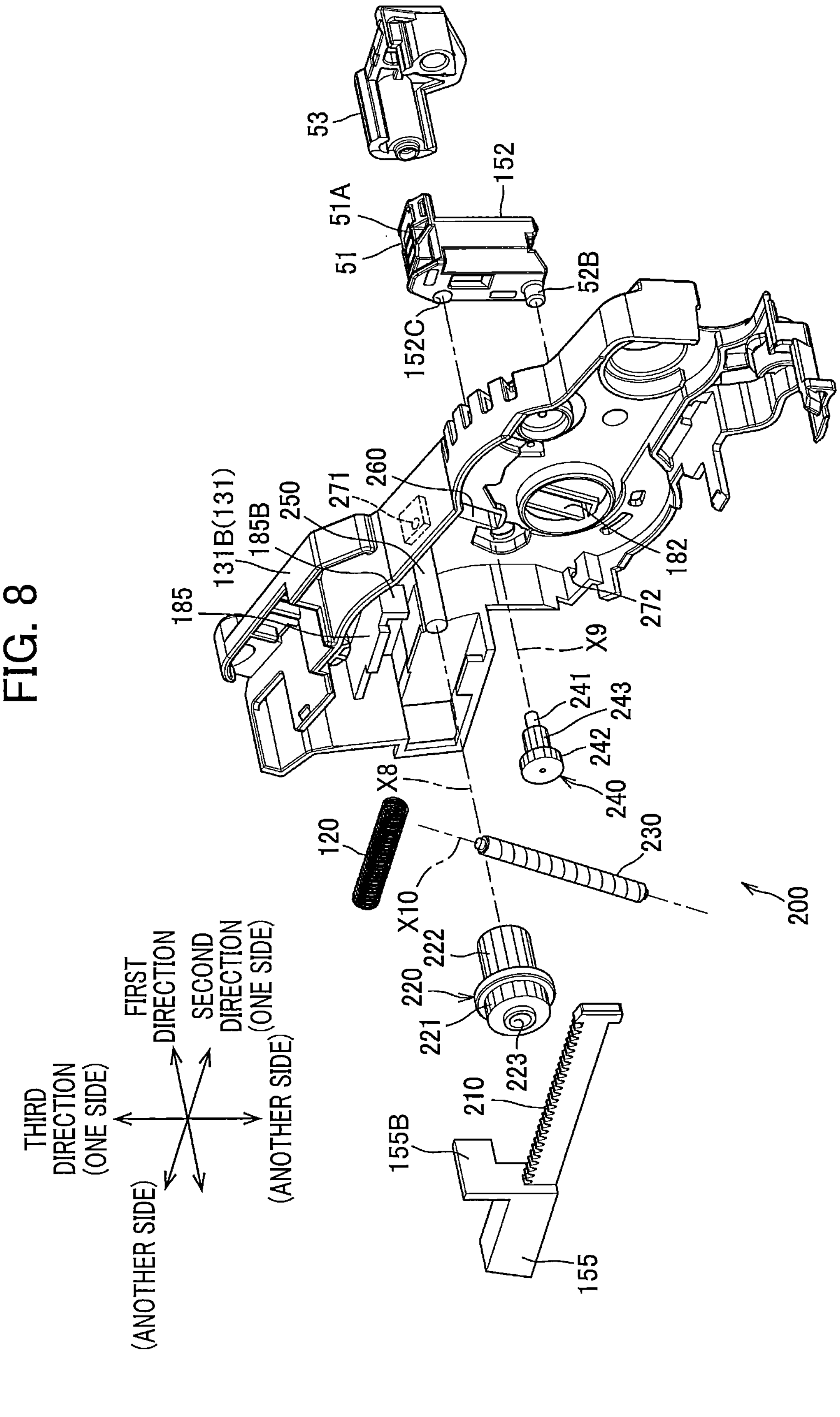
FIG. 8 is an exploded perspective view of an interlocking mechanism in a developing cartridge according to a second embodiment.

As illustrated in FIG. 8, an interlocking mechanism 200 of the developing cartridge according to the second embodiment includes the spring 120, a rack gear 210, a first pinion gear 220, a worm gear 230, a second pinion gear 240, a shaft 250, and a guide groove 260.

The spring 120 is the same compression coil spring as the first embodiment. A gear cover 131B of the second embodiment includes a wall portion 185B receiving the urging force of the spring 120 (see FIG. 9A). A plate 155 of the second embodiment includes a wall portion 155B receiving the urging force of the spring 120. That is, the spring 120 has one end in contact with the wall portion 185B, and another end in contact with the wall portion 155B. An initial load is imparted on the spring 120 in the state where the plate 155 is at the first position.

The rack gear 210 is formed integrally with the plate 155. The rack gear 210 is slidably movable in the second direction together with the plate 155.

The first pinion gear 220 is in meshing engagement with the rack gear 210. Specifically, the first pinion gear 220 includes a first gear 221 and a second gear 222. A hole 223 is formed in the first pinion gear 220. The shaft 250 extends in the first direction from the gear cover 131B. The shaft 250 extends through the hole 223, so that the first pinion gear 220 is rotatable about a first gear axis X8 extending in the first direction.

Specifically, the first gear 221 and the second gear 222 are rotatable about the first gear axis X8. The first gear 221 has an outer diameter greater than an outer diameter of the second gear 222. The first gear 221 is in meshing engagement with the rack gear 210. The second gear 222 is in meshing engagement with the worm gear 230. The second gear 222 may be a spur gear or a helical gear. Preferably, the second gear 222 is a helical gear in order to transmit a driving force from the second gear 222 to the worm gear 230.

The worm gear 230 is rotatable about a worm axis X10 extending in the third direction (assuming that the third direction crosses the first direction and the second direction). Here, the gear cover 131B has two support holes 271 and 272. The support hole 271 is apart from the support hole 272 in the third direction. The worm gear 230 has one end portion inserted in the support hole 271 and another end portion inserted in the support hole 272. The worm gear 230 is thus rotatably supported by the gear cover 131B. In the present embodiment, the worm axis X10 is inclined with respect to the third direction (assuming that the third direction is orthogonal to the first direction and the second direction).

The second pinion gear 240 is in meshing engagement with the worm gear 230. The second pinion gear 240 includes a shaft 241, a third gear 242, and a fourth gear 243. Here, a holder 152 of the second embodiment has a hole 152C in which the shaft 241 is inserted. The second pinion gear 240 is thus rotatable about a second gear axis X9 extending in the first direction.

Specifically, the third gear 242 and the fourth gear 243 are rotatable about the second gear axis X9. The third gear 242 has an outer diameter greater than an outer diameter of the fourth gear 243. The third gear 242 is in meshing engagement with the worm gear 230.

The guide groove 260 is a slot extending throughout a thickness of the gear cover 131B in the first direction. The guide groove 260 extends in the third direction (assuming that the third direction crosses the first direction and the second direction). Specifically, the guide groove 260 extends in parallel to the worm axis X10. As illustrated in FIG. 9B, the guide groove 260 has gear teeth 261. The gear teeth 261 are formed at an inner surface of the guide groove 260. The fourth gear 243 of the second pinion gear 240 is positioned in the guide groove 260 and is in meshing engagement with the gear teeth 261 of the guide groove 260. Incidentally, the guide groove 260 may be provided in a form of a recess having a closed bottom, instead of a slot.

Operations of the interlocking mechanism 200 according to the second embodiment thus constructed will be described below.

Figure 9A:
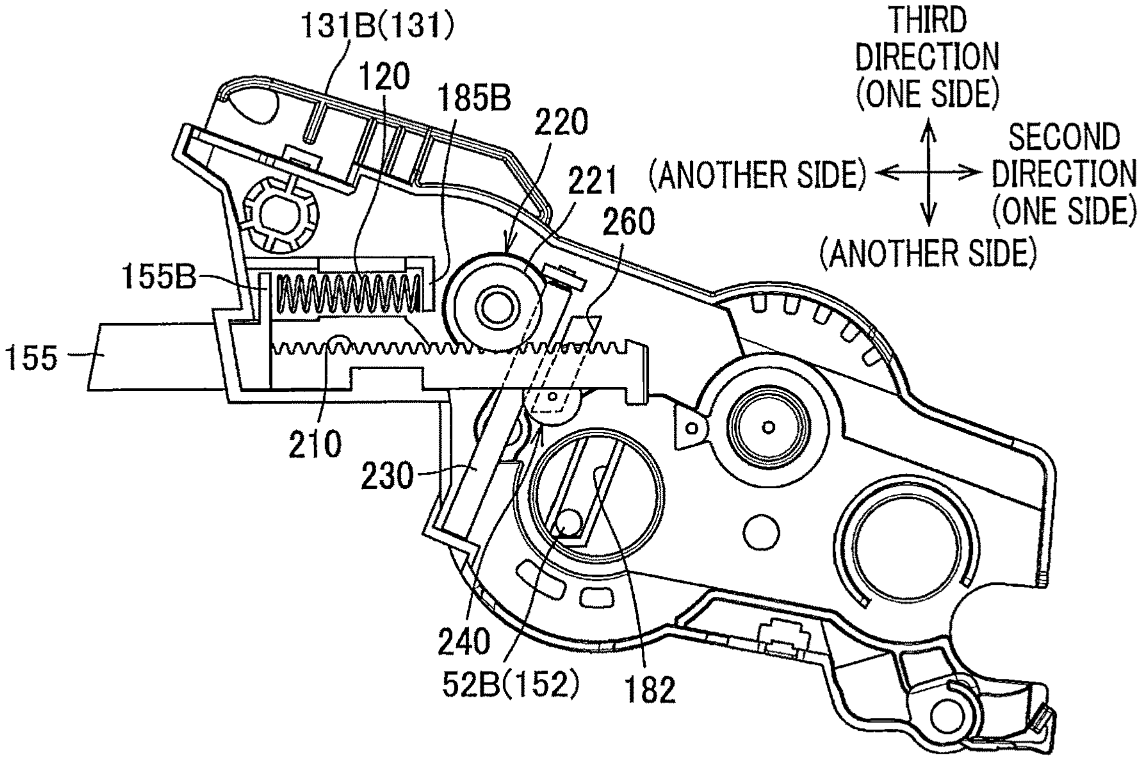
FIG. 9A is a view illustrating the interlocking mechanism in the developing cartridge according to the second embodiment when viewed from inside of the gear cover, and particularly illustrating a state where a plate is at a first position.
Figure 9B:
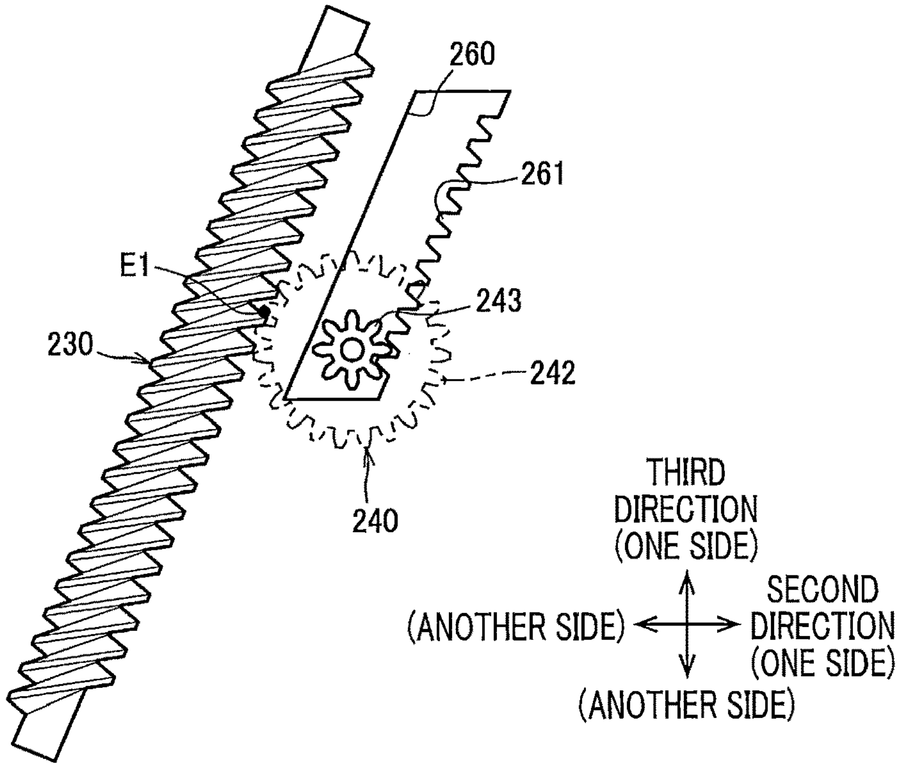
FIG. 9B is an enlarged view of a part of the interlocking mechanism of FIG. 9A.

The plate 155 is at the first position as illustrated in FIG. 9A in the state where the cover 12 is at the open position. At this time, the holder 152 is at the retracted position, since the second pinion gear 240 is positioned at one end of the guide groove 260 at another side in the third direction (lower end in FIG. 9B).

Figure 10A:
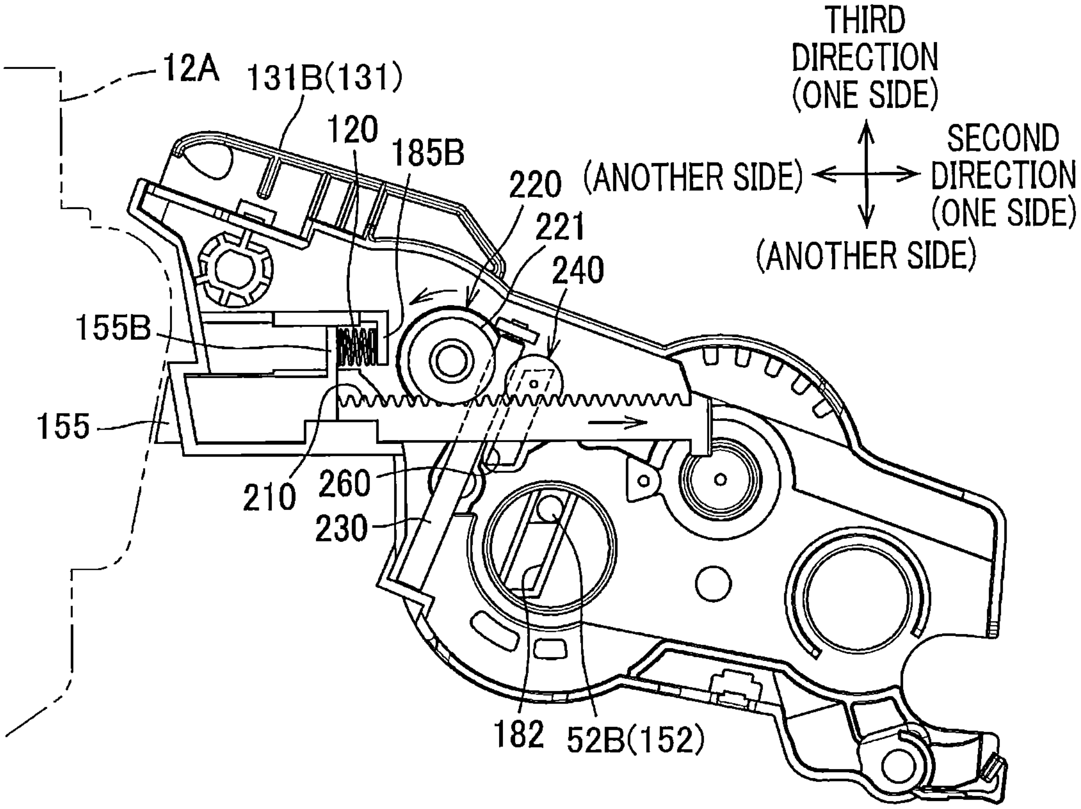
FIG. 10A is a view illustrating the interlocking mechanism in the developing cartridge according to the second embodiment when viewed from inside of the gear cover, and particularly illustrating a state where the plate is at a second position.
Figure 10B:
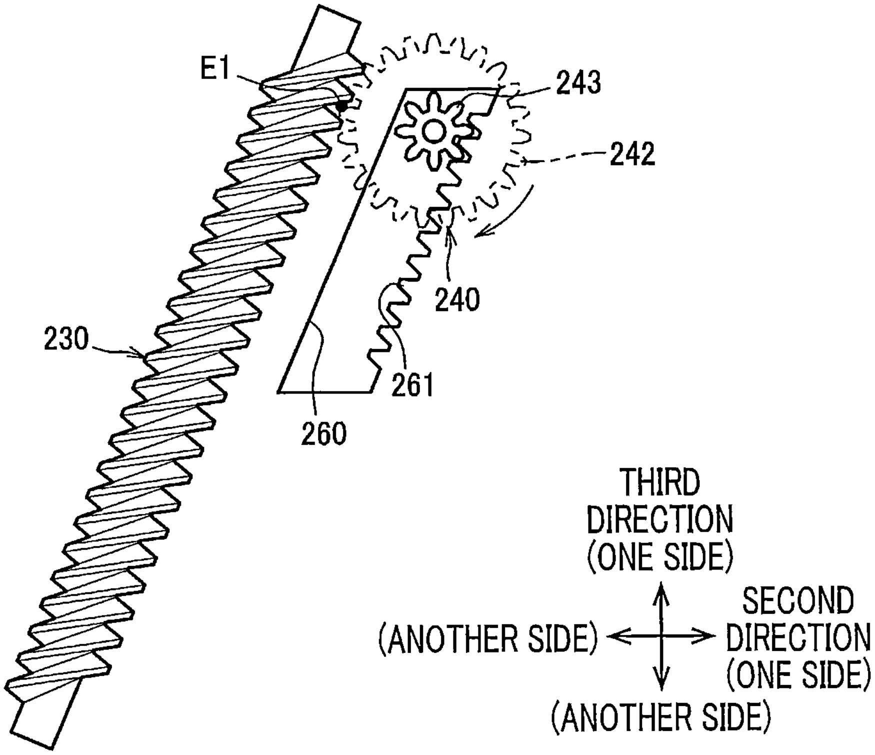
FIG. 10B is an enlarged view of a part of the interlocking mechanism of FIG. 10A.

As the cover 12 is closed from this state, the plate 155 is pushed by the protruding portion 12A of the cover 12, thereby moving the plate 155 relative to a casing 131 from the first position to the second position as illustrated in FIGS. 10A and 10B. At this time, the rack gear 210 moves toward the one side in the second direction (rightward in FIG. 10A) to rotate the first pinion gear 220. As the first pinion gear 220 rotates, the worm gear 230 in meshing engagement with the second gear 222 of the first pinion gear 220 is caused to rotate.

As the worm gear 230 rotates, a meshing position E1 (see FIG. 9B) between the second pinion gear 240 and the worm gear 230 moves toward the one side in the third direction (upward in FIG. 9B). Accordingly, the fourth gear 243 of the second pinion gear 240 moves along the guide groove 260 toward the one side in the third direction while rotating over the gear teeth 261 meshing therewith. The second pinion gear 240 thus reaches one end of the guide groove 260 at the one side in the third direction (upper end in FIG. 10B), so that the holder 152 is positioned at the advancing position.

In contrast, in a case where the cover 12 is moved from the closed position to the open position, the protruding portion 12A of the cover 12 pressing the plate 155 (as illustrated in FIGS. 10A and 10B) is separated away from the plate 155. The plate 155 therefore moves from the second position to the first position illustrated in FIG. 9A relative to the casing 131 by the urging force of the spring 120.

Accordingly, the rack gear 210 moves toward the other side in the second direction (leftward in FIG. 9A), the first pinion gear 220 rotates about the first gear axis X8, and the worm gear 230 rotates about the worm axis X10. Here, the worm gear 230 rotates in a direction opposite to a rotating direction thereof during the closing movement of the cover 12, so that the meshing position E1 between the worm gear 230 and the second pinion gear 240 moves toward the other side in the third direction (downward in FIG. 10B).

The fourth gear 243 of the second pinion gear 240 therefore moves along the guide groove 260 toward the other side in the third direction while rotating over the with the gear teeth 261 meshing therewith. In this way, the second pinion gear 240 comes to the one end of the guide groove 260 at the other side in the third direction (lower end in FIG. 9B) so that the holder 152 is positioned at the retracted position.

As described above, in the developing cartridge according to the second embodiment, the holder 152 can move from the retracted position to the advancing position in association with the movement of the plate 155 from the first position to the second position.

Various modifications can be made to the second embodiment.

For example, in the second embodiment, the shaft 241 of the second pinion gear 240 is inserted in the hole 152C of the holder 152. However, alternatively, the holder 152 may have a shaft, and the second pinion gear 240 may have a hole for receiving the shaft.

Further, in the second embodiment, the spring 120 is in contact with the plate 155 to urge the plate 155 toward the first position from the second position. However, the spring may not be in contact with the plate 155. For example, instead of the spring 120, the developing cartridge may include a spring in contact with the holder 152. In this case, the spring urges the holder 152 toward the retracted position from the advancing position to urge the plate 155 from the second position toward the first position through the interlocking mechanism 200.

Further, the developing cartridge may include a spiral spring configured to impart a rotational force to the first pinion gear 220. In this case, the spiral spring urges the plate 155 from the second position toward the first position through a part of the interlocking mechanism 200.

Further, the gear teeth 261 may be omitted from the guide groove 260, as long as the guide groove 260 has a portion capable of contacting with the second pinion gear 240 to generate a sufficient frictional force with respect to the second pinion gear 240 to rotate the same.

Third Embodiment

A developing cartridge according to a third embodiment will next be described with reference to FIGS. 11A through 12B, wherein like parts and components are designated by the same reference numerals as those shown in the first embodiment. The third embodiment is the same as the first embodiment except a structure in relation to the interlocking mechanism.

Figure 11A:
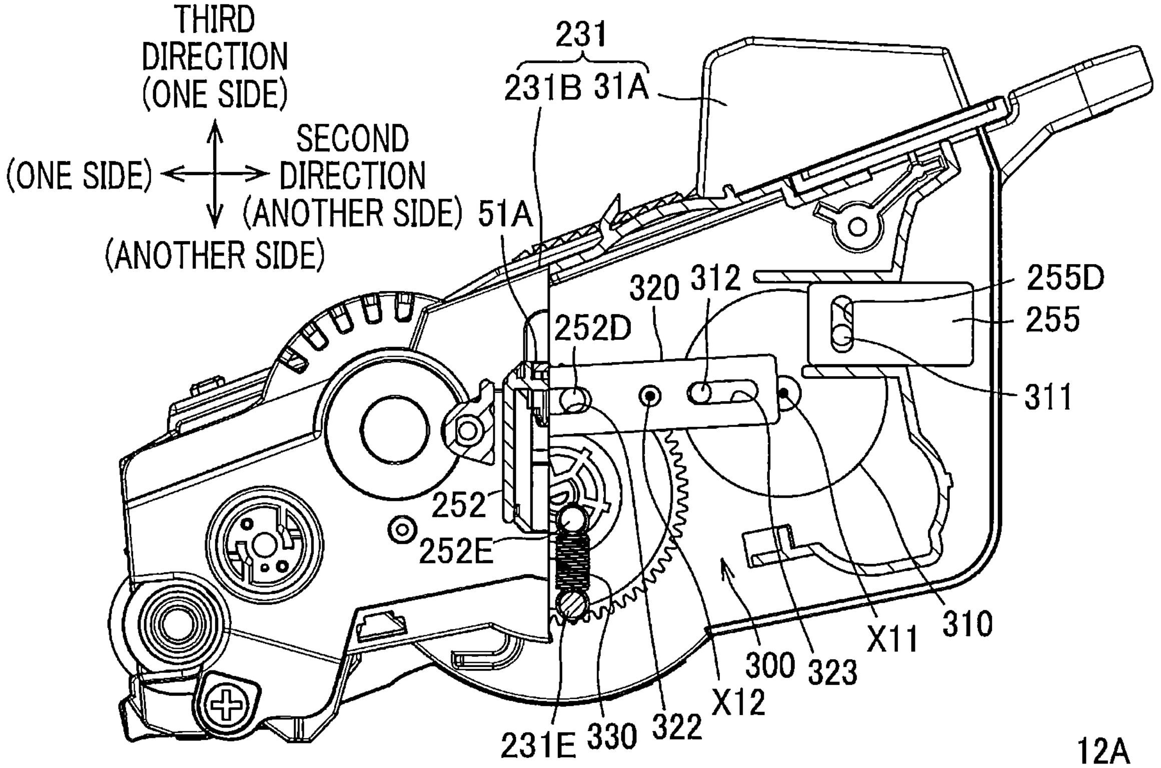
FIG. 11A is a view illustrating an interlocking mechanism in a developing cartridge according to a third embodiment with a gear cover partially cut away, and particularly illustrating a state where a plate is at a first position.

As illustrated in FIG. 11A, an interlocking mechanism 300 of the developing cartridge according to the third embodiment includes a first link 310, a second link 320, and a spring 330.

The first link 310 is supported such that the first link 310 is pivotably movable (angularly rotatable) about a first axis X11 extending in the first direction relative to a casing 231. The first link 310 has a first pin 311 protruding in the first direction. The first pin 311 is at a position away from the first axis X11 toward the other side in the second direction. The first link 310 also has a boss 312 protruding in the first direction. The boss 312 is at a position away from the first axis X11 toward the one side in the second direction.

A plate 255 according to the third embodiment is supported by the casing 231 such that the plate 255 is slidably movable in the second direction. The plate 255 is movable between a first position illustrated in FIG. 11A and a second position illustrated in FIG. 11B. The plate 255 has a first slot 255D extending in a direction crossing the second direction. In the present embodiment, the first slot 255D extends in the third direction. The first pin 311 of the first link 310 is inserted in the first slot 255D. The first link 310 is thus connected to the plate 255 by the insertion of the first pin 311 in the first slot 255D.

The second link 320 is supported such that the second link 320 is pivotally movable about a second axis X12 extending in the first direction relative to the casing 231. The second link 320 has a second slot 322 extending in a direction crossing the third direction. The second slot 322 is at a position away from the second axis X12 toward the one side in the second direction. Further, the second link 320 includes a third slot 323 extending in a direction crossing the third direction. The third slot 323 is at a position away from the second axis X12 toward the other side in the second direction.

The boss 312 of the first link 310 is inserted in the third slot 323 of the second link 320. The second link 320 is connected to the first link 310 by the insertion of the boss 312 in the third slot 323.

A holder 252 of the third embodiment includes a second pin 252D and a boss 252E. The second pin 252D is inserted in the second slot 322 of the second link 320. The second link 320 is thus connected to the holder 252 by the insertion of the second pin 252D in the second slot 322.

A gear cover 231B according to the third embodiment includes a boss 231E. The spring 330 is a tension coil spring. The spring 330 extends in the third direction. The spring 330 has one end in the third direction engaged with the boss 252E of the holder 252. The spring 330 has another end in the third direction engaged with the boss 231E of the gear cover 231B. The spring 330 urges the holder 252 toward the retracted position from the advancing position. The spring 330 urges the plate 255 from the second position toward the first position through the interlocking mechanism 300.

Operations of the interlocking mechanism 300 in the developing cartridge according to the third embodiment thus constructed will be described next.

The plate 255 is at the first position as illustrated in FIG. 11A in the state where the cover 12 is at the open position. At this time, the holder 252 is at the retracted position.

Figure 11B:
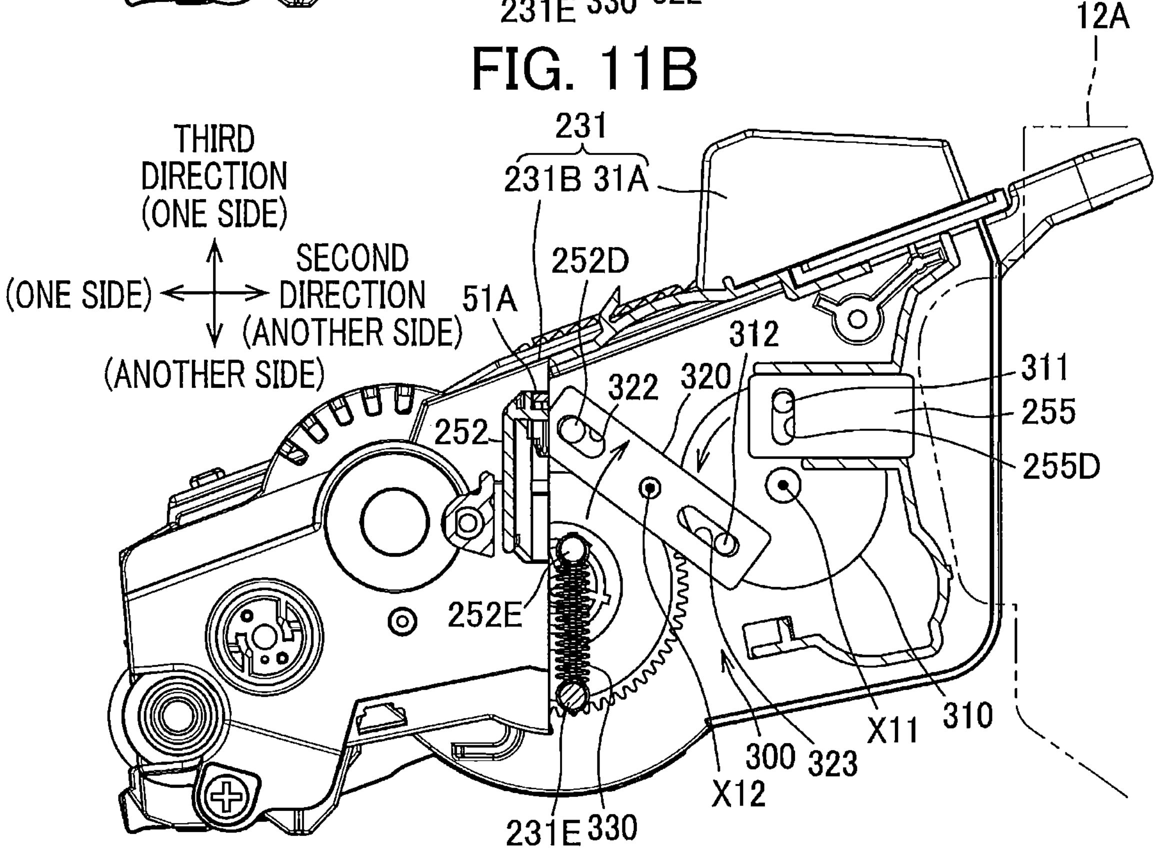
FIG. 11B is a view illustrating the interlocking mechanism in the developing cartridge according to the third embodiment with the gear cover partially cut away, and particularly illustrating a state where the plate is at a second position.

When the cover 12 is closed from this state, the plate 255 is pushed by the protruding portion 12A of the cover 12, thereby moving the plate 255 from the first position to the second position as illustrated in FIG. 11B.

Accordingly, the first slot 255D of the plate 255 pushes the first pin 311, thereby pivotably moving the first link 310 about the first axis X11 in a counterclockwise direction in FIG. 11B. The boss 312 of the first link 310 pushes the third slot 323 of the second link 320, causing the second link 320 to pivot about the second axis X12 in a clockwise direction in FIG. 11B. Further, the second slot 322 of the second link 320 pushes the second pin 252D of the holder 252 toward the one side in the third direction (upward in FIG. 11B). The holder 252 thus moves toward the one side in the third direction. That is, the holder 252 moves from the retracted position to the advancing position. The spring 330 is stretched in accordance with the movement of the holder 252 to the advancing position.

In a case where the cover 12 is moved from the closed position to the open position, reversely, the protruding portion 12A of the cover 12 pressing the plate 255 as illustrated in FIG. 11B is separated away from the plate 255. The holder 252 thereby moves from the advancing position to the retracted position by the urging force of the spring 330. At this time, the second link 320 pivots in the counterclockwise direction, and the first link 310 rotates in the clockwise direction, contrary to those directions during the closing movement of the cover 12. The plate 255 thus moves from the second position to the first position.

As described above, in the developing cartridge according to the third embodiment, the holder 252 can move from the retracted position to the advancing position in association with the movement of the plate 255 from the first position to the second position.

Various modifications may be made to the third embodiment.

For example, the plate 255 may have the first pin and the first link 310 may have the first slot. Further, the second link 320 may have the second pin and the holder 252 may have the second slot. Further, the first slot 255D need not extend in parallel to the third direction, but may extend in a direction crossing the moving direction of the plate 255.

Further, the plate 255 need not be slidably supported, but may be pivotably supported with respect to the casing 231.

Still further, the developing cartridge may include additional link member at a position between the first link 310 and the second link 320, or between the second link 320 and the holder 252.

Figure 12A:
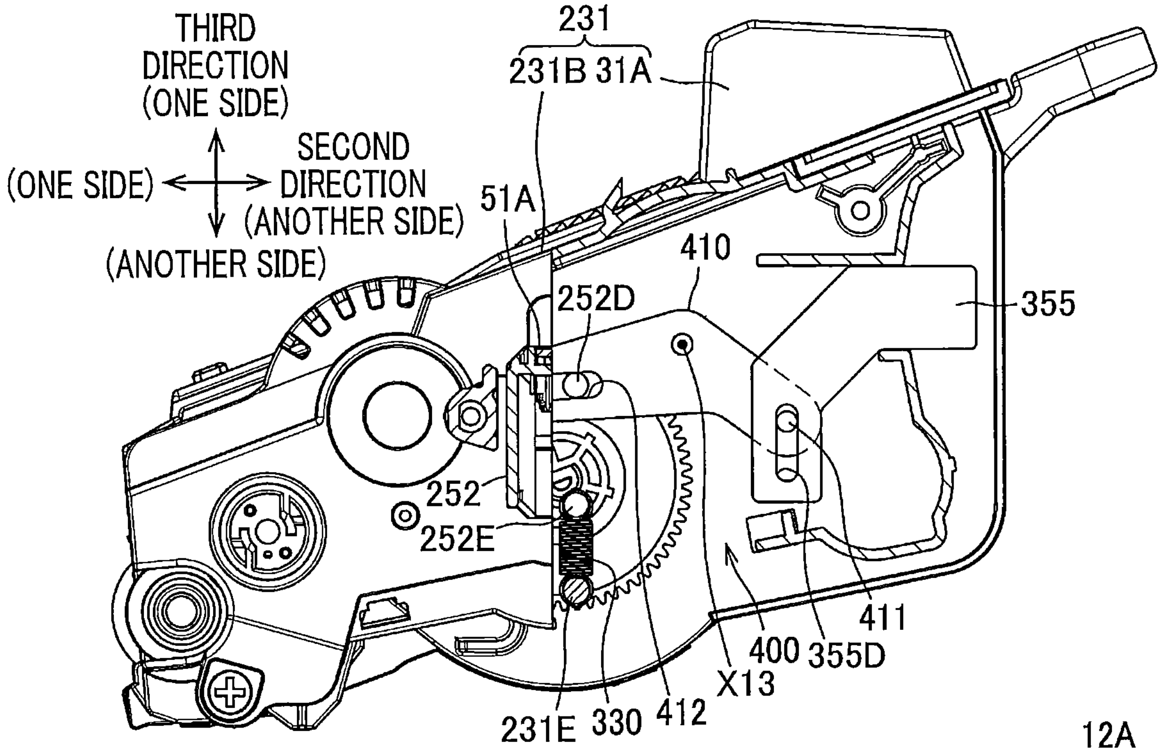
FIG. 12A is a view illustrating, with the gear cover partially cut away, an interlocking mechanism in a developing cartridge according to a modification to the third embodiment in which a first link of the third embodiment is directly connected to a holder, and particularly illustrating a state where a plate is at a first position.
Figure 12B:
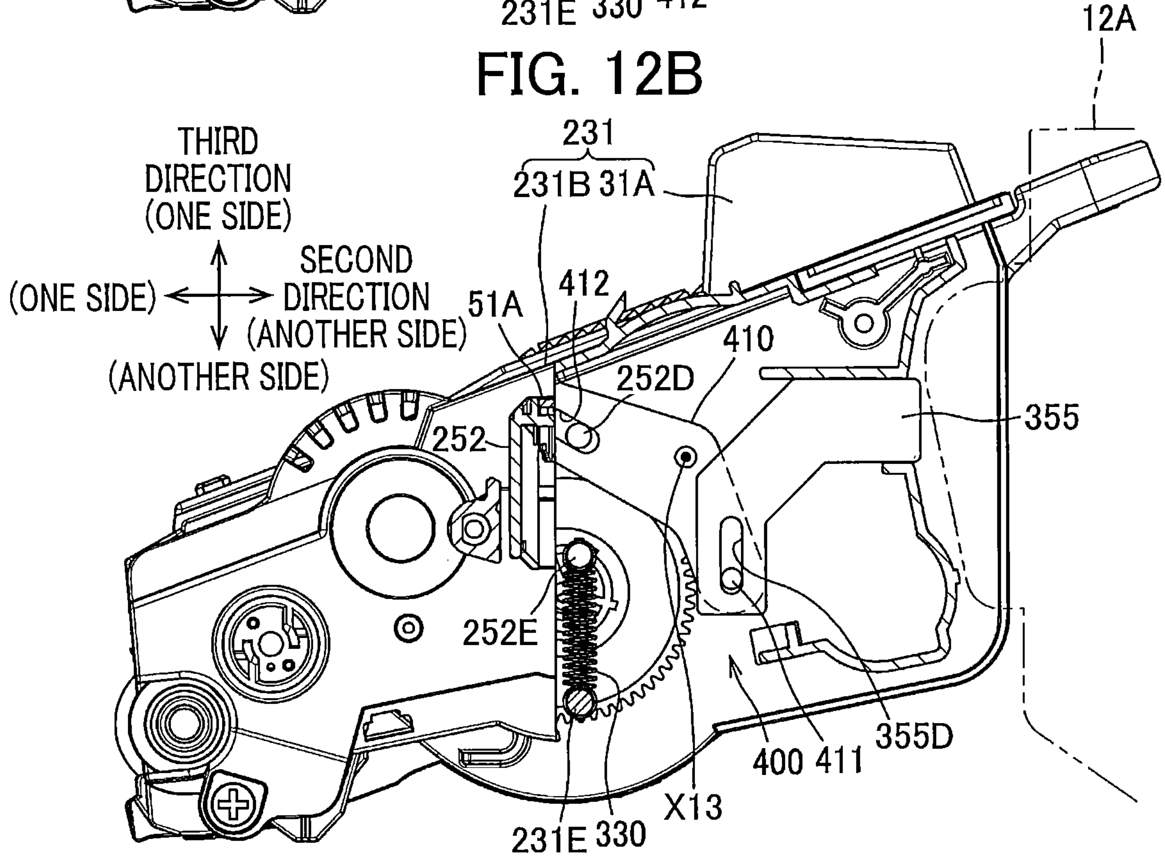
FIG. 12B is a view illustrating, with the gear cover partially cut away, the interlocking mechanism in the developing cartridge according to the modification to the third embodiment, and particularly illustrating a state where the plate is at a second position.

Still further, the first link may be directly connected to the holder 252. For example, FIGS. 12A and 12B illustrate a modification to the third embodiment including an interlocking mechanism 400. A plate 355 according to this modification has a first slot 355D. A first link 410 has a first pin 411 inserted in the first slot 355D. The first link 410 also has a second slot 412 in which the second pin 252D of the holder 252 is inserted. With this structure, the first link 410 can pivot clockwise about an axis X13 thereof in response to the sliding movement of the plate 355 from the first position illustrated in FIG. 12A to the second position illustrated in FIG. 12B. As a result, the holder 252 can move from the retracted position to the advancing position.

While the disclosure has been described in detail with reference to the embodiments, it would be apparent to those skilled in the art that many modifications and variations may be made thereto. The embodiments as described above are merely exemplary.

The developing cartridge of the disclosure may be used in a monochromatic image-forming apparatus or in a color image-forming apparatus. Further, the plate of the disclosure may be configured to be pushed by a user, rather than by the cover of the image forming apparatus.

Still further, the components described in the respective embodiments and modifications may be selectively combined with one another.

REMARKS

The developing cartridge 30 is an example of a developing cartridge of the disclosure. The casing 31, 131, 231 is an example of a casing. The developing memory 51 is an example of a developing memory. The electrical contact surface 51A is an example of an electrical contact surface. The developing roller 32 is an example of a developing roller. The agitator 35 is an example of an agitator. The agitator gear 60 is an example of an agitator gear. The holder 52, 152, 252 is an example of a holder. The plate 55, 155, 255, 355 is an example of a plate. The casing body 31A is an example of a casing body. The gear cover 31B, 131B, 231B is an example of a gear cover. The spring 120, 330 is an example of a spring. The interlocking mechanism 100, 20, 300, 400 is an example of an interlocking mechanism. The cam 110 of the interlocking mechanism 100 is an example of a cam. The sloped surface 112B is an example of a sloped surface. The rack gear 210, first pinion gear 220, worm gear 230, second pinion gear 240 of the interlocking mechanism 200 are examples of a rack gear, a first pinion gear, a worm gear and a second pinion gear of the interlocking mechanism. The guide groove 260 is an example of a guide groove of the casing. The third gear 242 and fourth gear 243 are examples of a third gear and a fourth gear of the second pinion gear. The first link 310, 410 is an example of a first link of the interlocking mechanism. The second link 320 is an example of a second link of the interlocking mechanism. The protrusion 58 is an example of a protrusion at the casing. The holder cover 53 is an example of a holder cover.

What is claimed is:

1. A developing cartridge comprising:

a casing configured to accommodate toner therein;

a developing roller rotatable about a developing axis extending in a first direction, the developing roller being positioned at one end portion of the casing in a second direction crossing the first direction;

a developing memory having an electrical contact surface facing in a third direction crossing the first direction and the second direction;

an agitator rotatable about an agitator axis extending in the first direction and configured to agitate the toner accommodated in the casing;

an agitator gear positioned at one end of the agitator in the first direction and rotatable about the agitator axis together with the agitator;

a holder holding the electrical contact surface and movable relative to the casing in the third direction between a retracted position and an advancing position, a distance in the third direction between the electrical contact surface and the agitator axis at the advancing position of the holder being greater than a distance in the third direction between the electrical contact surface and the agitator axis at the retracted position of the holder; and a plate movable relative to the casing between a first position and a second position, the holder being movable from the retracted position to the advancing position in response to a movement of the plate from the first position to the second position, the plate being positioned farther away from the developing roller than the agitator gear and the holder are from the developing roller in the second direction.

2. The developing cartridge according to claim 1, wherein the casing comprises:

a casing body configured to accommodate the toner therein; and a gear cover covering at least a part of the agitator gear, and wherein the agitator gear comprises:

a large diameter gear; and a small diameter gear having a diameter smaller than a diameter of the large diameter gear, the small diameter gear being positioned between the large diameter gear and the casing body in the first direction.

3. The developing cartridge according to claim 2, wherein the holder is positioned opposite to the small diameter gear with respect to the large diameter gear in the first direction.

4. The developing cartridge according to claim 2, further comprising a protrusion protruding out in the first direction from one end of the casing body in the first direction, the protrusion being positioned between the casing body and the large diameter gear in the first direction, wherein the protrusion is spaced apart from the developing roller in the second direction by a distance smaller than a distance between the developing roller and the small diameter gear in the second direction.

5. The developing cartridge according to claim 1, wherein the plate is positioned at another end portion of the casing in the second direction, the plate protruding out in the second direction from the casing in a state where the plate is at the first position.

6. The developing cartridge according to claim 1, further comprising a spring urging the plate in the second direction toward the first position from the second position.

7. The developing cartridge according to claim 1, further comprising an interlocking mechanism connected to the plate and to the holder, the interlocking mechanism being configured to place the holder at the retracted position in a state where the plate is at the first position, and to place the holder at the advancing position in a state where the plate is at the second position, the second position being closer to the developing roller than the first position is to the developing roller in the second direction.

8. The developing cartridge according to claim 7, wherein the interlocking mechanism includes a cam movable in association with movement of the plate in the second direction between the first position and the second position, the cam being in contact with the holder to move the holder between the retracted position and the advancing position.

9. The developing cartridge according to claim 8, wherein the cam is a translation cam movable in the second direction relative to the casing.

10. The developing cartridge according to claim 8, wherein the cam has a sloped surface configured to contact the holder, the sloped surface being inclined with respect to a moving direction of the cam.

11. The developing cartridge according to claim 8, wherein the cam is movable integrally with the plate.

12. The developing cartridge according to claim 7, wherein the interlocking mechanism includes:

- a rack gear movable in the second direction together with the plate;
- a first pinion gear in meshing engagement with the rack gear;
- a worm gear in meshing engagement with the first pinion gear and rotatable about a worm axis extending in the third direction; and
- a second pinion gear in meshing engagement with the worm gear and movable in the third direction together with the holder.

13. The developing cartridge according to claim 12, wherein the first pinion gear includes a first gear in meshing engagement with the rack gear, and a second gear in meshing engagement with the worm gear.

14. The developing cartridge according to claim 12, wherein the casing has a guide groove configured to guide the second pinion gear and extending in the third direction, the guide groove having gear teeth, and wherein the second pinion gear comprises:

- a third gear in meshing engagement with the worm gear; and
- a fourth gear in meshing engagement with the gear teeth of the guide groove.

15. The developing cartridge according to claim 7, wherein the interlocking mechanism includes a link supported by the casing and pivotally movable about a first axis relative to the casing, the link being connected to the plate and pivotable relative to the plate, the link being connected to the holder.

16. The developing cartridge according to claim 15, wherein one of the plate and the link has a slot extending in a direction crossing the second direction, and a remaining one of the plate and the link has a pin inserted in the slot.

17. The developing cartridge according to claim 15, wherein the link is a first link, and wherein the interlocking mechanism further includes a second link supported by the casing and pivotally movable about a second axis extending in the first direction relative to the casing, the second link being connected to the first link and pivotable relative to the first link, the second link being connected to the holder and pivotable relative to the holder.

18. The developing cartridge according to claim 17, wherein one of the second link and the holder has a slot extending in a direction crossing the third direction, and a remaining one of the second link and the holder has a pin inserted in the slot.

19. The developing cartridge according to claim 1, further comprising a holder cover holding the holder such that the holder is movable between the retracted position and the advancing position relative to the casing.

20. The developing cartridge according to claim 1, wherein the developing cartridge is configured to be attached to an apparatus body of an image-forming apparatus including: a housing having an opening; and a cover pivotally movable relative to the housing between a closed position where the cover closes the opening and an open position where the cover opens the opening, the developing cartridge being attachable to the apparatus body through the opening, and wherein the plate is pushed by the cover to move from the first position to the second position in a state where the developing cartridge is attached to the apparatus body and the cover is moved from the open position to the closed position.

* * * * *